United States Patent
Cadima (10) Patent No.: US 11,499,723 B2
(45) Date of Patent: Nov. 15, 2022

(54) GRIDDLE COVER WITH AN INTEGRATED SPLATTER SHIELD

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 511 days.

(21) Appl. No.: 16/585,171

(22) Filed: Sep. 27, 2019

(65) Prior Publication Data
US 2021/0095865 A1 Apr. 1, 2021

(51) Int. Cl.
*F24C 15/36* (2006.01)
*A47J 36/36* (2006.01)
*A47J 37/06* (2006.01)

(52) U.S. Cl.
CPC .............. *F24C 15/36* (2013.01); *A47J 36/36* (2013.01); *A47J 37/067* (2013.01)

(58) Field of Classification Search
CPC ........ F24C 15/08; F24C 15/107; F24C 15/12; F24C 15/14; F24C 15/18; F24C 15/30; F24C 15/34; F24C 15/36; A47J 37/0611; A47J 37/067; A47J 37/0676; A47J 37/0704; A47J 37/0718; A47J 37/0786; A47J 37/10; A47J 37/101; A47J 37/103; A47J 36/022; A47J 36/32; A47J 36/36
USPC .............. 126/37 A, 39 H, 39 M, 211, 214 A, 126/214 C, 214 D, 220; 99/422, 423, 99/424, 427, 433, 445
See application file for complete search history.

(56) References Cited

U.S. PATENT DOCUMENTS

| | | | |
|---|---|---|---|
| 2,702,848 A | 2/1955 | Scofield et al. | |
| 2,823,657 A | 2/1958 | Brodbeck | |
| 2,836,171 A | 5/1958 | Cripe | |
| 4,697,504 A * | 10/1987 | Keating | A47J 37/0611 126/41 R |
| D457,393 S | 5/2002 | Lewis | |
| 8,763,519 B2 * | 7/2014 | Ricchio | A47J 37/0611 99/379 |
| 11,051,653 B2 * | 7/2021 | Kelly | A47J 37/0611 |
| 2014/0096761 A1 * | 4/2014 | Brantley | A47J 37/067 126/39 M |
| 2014/0123861 A1 * | 5/2014 | Cooper | A47J 37/0611 99/379 |
| 2016/0029838 A1 * | 2/2016 | Freymiller | A47J 37/0611 99/376 |
| 2016/0309941 A1 * | 10/2016 | Minard | A47J 37/0611 |

(Continued)

FOREIGN PATENT DOCUMENTS

JP 2011240008 A 12/2011

*Primary Examiner* — Hung D Nguyen
(74) *Attorney, Agent, or Firm* — Dority & Manning, P.A.

(57) ABSTRACT

A cooktop appliance includes a top panel. A griddle is positioned on the top panel. The griddle includes a cooking plate. A cover is rotatable relative to the cooking plate between a closed configuration and an open configuration. The cover is positioned over a top surface of the cooking plate in the closed configuration of the cover. A splatter shield is rotatable relative to the cover between a closed configuration and an open configuration. The splatter shield is positioned over the top surface of the cooking plate in the open configuration of the splatter shield.

20 Claims, 8 Drawing Sheets

(56) References Cited

U.S. PATENT DOCUMENTS

2018/0255970 A1* 9/2018 Rudy ................... A47J 37/0611
2020/0268189 A1* 8/2020 Anthony ............. A47J 37/0641

* cited by examiner

GRIDDLE COVER WITH AN INTEGRATED SPLATTER SHIELD

FIELD OF THE INVENTION

The present subject matter relates generally to griddles for appliances.

BACKGROUND OF THE INVENTION

Griddles are commonly used on cooktop appliances. Commercial style cooktop appliances frequently include an integrated griddle. Some integrated griddles include a decorative cover, which is removed prior to use. After removal, a user must find a suitable place to store the large, unwieldy cover.

Griddles also have other drawbacks. For example, foods commonly cooked on griddles, such as bacon, sausage, and other high fat foods, tend to generate a large amount of grease. The grease frequently splatters over adjacent surfaces and is difficult to clean.

BRIEF DESCRIPTION OF THE INVENTION

Aspects and advantages of the invention will be set forth in part in the following description, or may be apparent from the description, or may be learned through practice of the invention.

In an example embodiment, a cooktop appliance includes a top panel. A griddle is positioned on the top panel. The griddle includes a cooking plate. A cover is rotatable relative to the cooking plate between a closed configuration and an open configuration. The cover is positioned over a top surface of the cooking plate in the closed configuration of the cover. A splatter shield is rotatable relative to the cover between a closed configuration and an open configuration. The splatter shield is nested within the cover in the closed configuration of the splatter shield, and the splatter shield is positioned over the top surface of the cooking plate in the open configuration of the splatter shield.

In another example embodiment, a cooktop appliance includes a top panel. A griddle is positioned on the top panel. The griddle includes a cooking plate. A cover is rotatable relative to the cooking plate between a closed configuration and an open configuration. The cover is positioned over a top surface of the cooking plate in the closed configuration of the cover. A splatter shield is rotatable relative to the cover between a closed configuration and an open configuration. The splatter shield is positioned over the top surface of the cooking plate in the open configuration of the splatter shield. The cooking plate, the cover and the splatter shield are rectangular.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure relates generally to a griddle for a double-oven cooktop range appliance 100. Although range appliance 100 is used below for the purpose of explaining the details of the present subject matter, it will be appreciated that the present subject matter may be used in or with any other suitable appliance in alternative example embodiments. For example, the griddle described below may be used on other types of cooking appliances, such as single oven range appliances or stand-alone cooktop appliances. Range appliance 100 is used in the discussion below only for the purpose of explanation, and such use is not intended to limit the scope of the present disclosure to any particular style of appliance.

Figure 1:
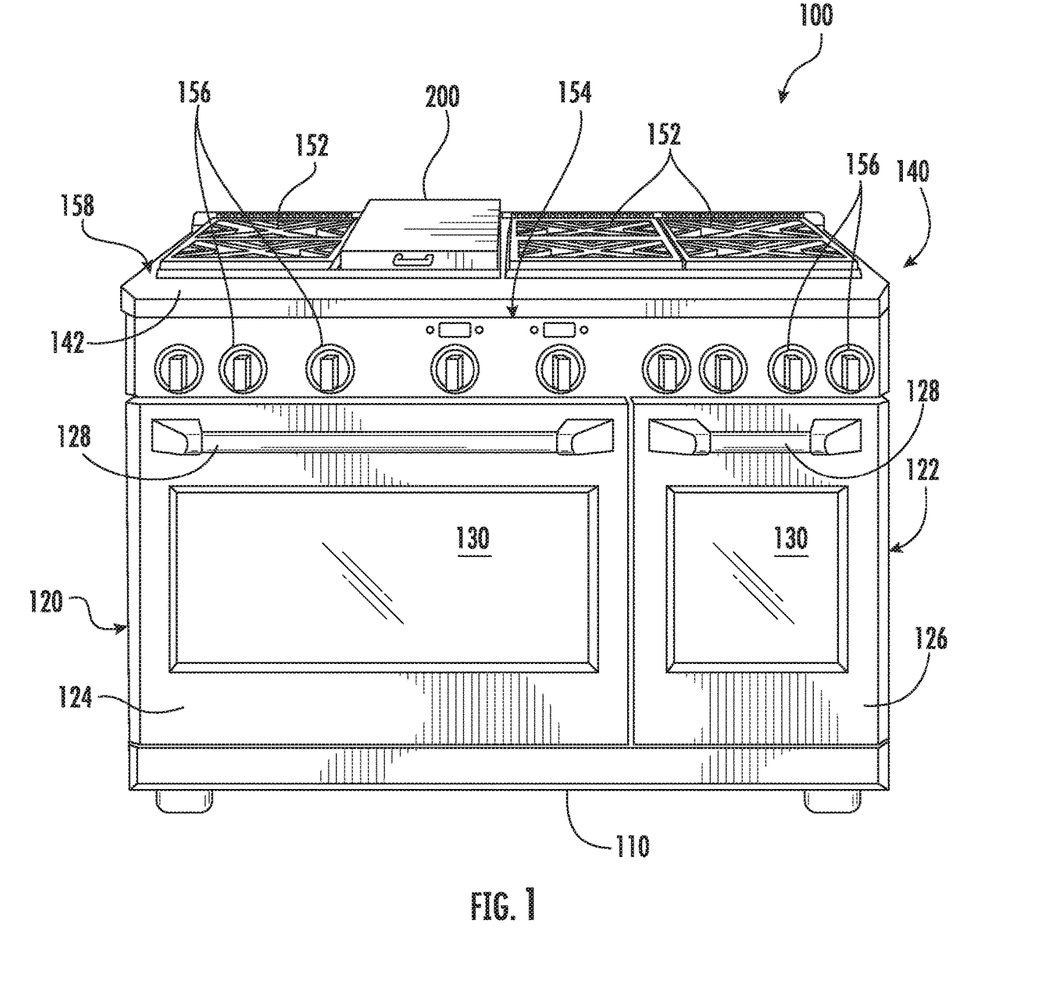
FIG. 1 is a perspective view of a range cooktop appliance according to an example embodiment.

FIG. 1 is a perspective view of range appliance 100 according to an example embodiment. Range appliance 100 includes an insulated cabinet 110. Cabinet 110 defines a primary cooking chamber 120 and a secondary cooking chamber 122. Thus, range appliance 100 is generally referred to as a double oven range appliance and has a "commercial" style or appearance. As will be understood by those skilled in the art, range appliance 100 is provided by way of example only, and the present subject matter may be used in any suitable cooktop appliance, e.g., a single oven range appliance or a standalone cooktop appliance. Thus, the exemplary embodiment shown in FIG. 1 is not intended to limit the present subject matter to any particular cooktop appliance configuration or arrangement.

Primary and secondary cooking chambers 120, 122 are configured for the receipt of one or more food items to be cooked. Range appliance 100 includes a primary door 124 and a secondary door 126 rotatably attached to cabinet 110 in order to permit selective access to primary cooking chamber 120 and secondary cooking chamber 122, respectively. Handles 128 are mounted to primary and secondary doors 124, 126 to assist a user with opening and closing doors 124, 126 in order to access cooking chambers 120, 122. As an example, a user can pull on handle 128 mounted to primary door 124 to open or close primary door 124 and access primary cooking chamber 120. Glass window panes 130 provide for viewing the contents of primary and secondary cooking chambers 120, 122 when doors 124, 126 are closed and also assist with insulating primary and secondary cooking chambers 120, 122. Heating elements (not shown), such as electric resistance heating elements, gas burners, microwave heating elements, halogen heating elements, or suitable combinations thereof, are positioned within primary cooking chamber 120 and secondary cooking chamber 122 for heating primary cooking chamber 120 and secondary cooking chamber 122.

Range appliance 100 also includes a cooktop 140. Cooktop 140 is positioned at or adjacent a top portion of cabinet 110. Thus, cooktop 140 is positioned above primary and secondary cooking chambers 120 and 122. Cooktop 140 includes a top panel 142. By way of example, top panel 142 may be constructed of stainless steel, enameled steel, glass, ceramics, and combinations thereof.

For range appliance 100, a utensil holding food and/or cooking liquids (e.g., oil, water, etc.) may be placed onto grates 152 at a location of burner assemblies (not shown) below the grates 152. The burner assemblies provide thermal energy to cooking utensils on grates 152. The burners assemblies can be configured in various sizes so as to provide e.g., for the receipt of cooking utensils (i.e., pots, pans, etc.) of various sizes and configurations and to provide different heat inputs for such cooking utensils. Grates 152 are supported on a top surface 158 of top panel 142. Range appliance 100 also includes a griddle 200 positioned at a middle portion of top panel 142, as may be seen in FIG. 1.

A user interface panel 154 is located within convenient reach of a user of the range appliance 100. For this exemplary embodiment, user interface panel 154 includes knobs 156 that are each associated with one of the burner assemblies. Knobs 156 allow the user to activate each burner assembly and determine the amount of heat input provided by each burner assembly to a cooking utensil located thereon. User interface panel 154 may also be provided with one or more graphical display devices that deliver certain information to the user such as e.g., whether a particular burner assembly is activated and/or the rate at which the burner assembly is set.

Although shown with knobs 156, it should be understood that knobs 156 and the configuration of range appliance 100 shown in FIG. 1 is provided by way of example only. More specifically, user interface panel 154 may include various input components, such as one or more of a variety of touch-type controls, electrical, mechanical or electro-mechanical input devices including rotary dials, push buttons, and touch pads, e.g., in addition to knobs 156. The user interface panel 154 may include other display components, such as a digital or analog display device designed to provide operational feedback to a user.

Figure 2:
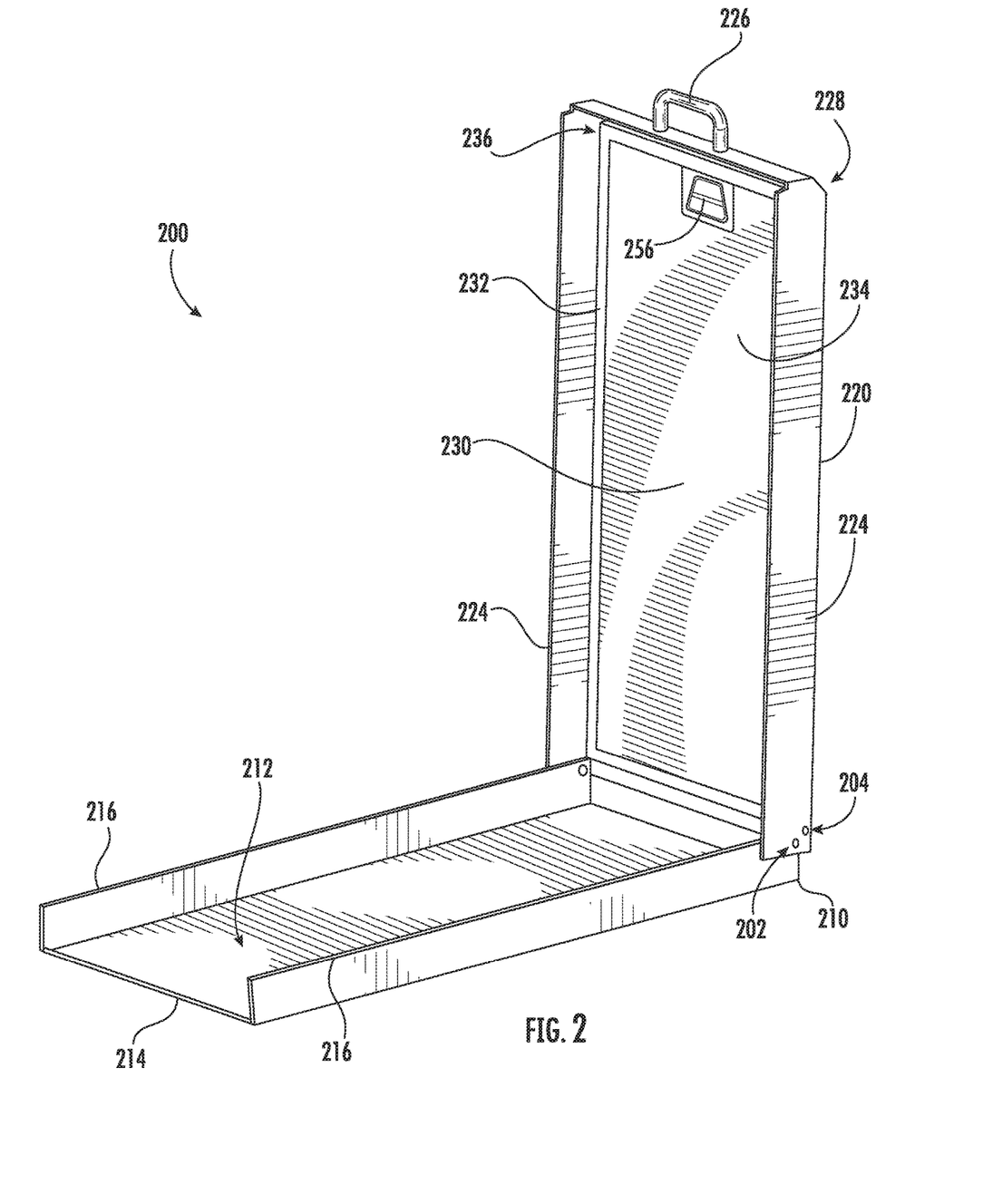
FIGS. 2 through 4 are perspective views of a griddle of the example cooktop appliance of FIG. 1 in various configurations.
Figure 3:
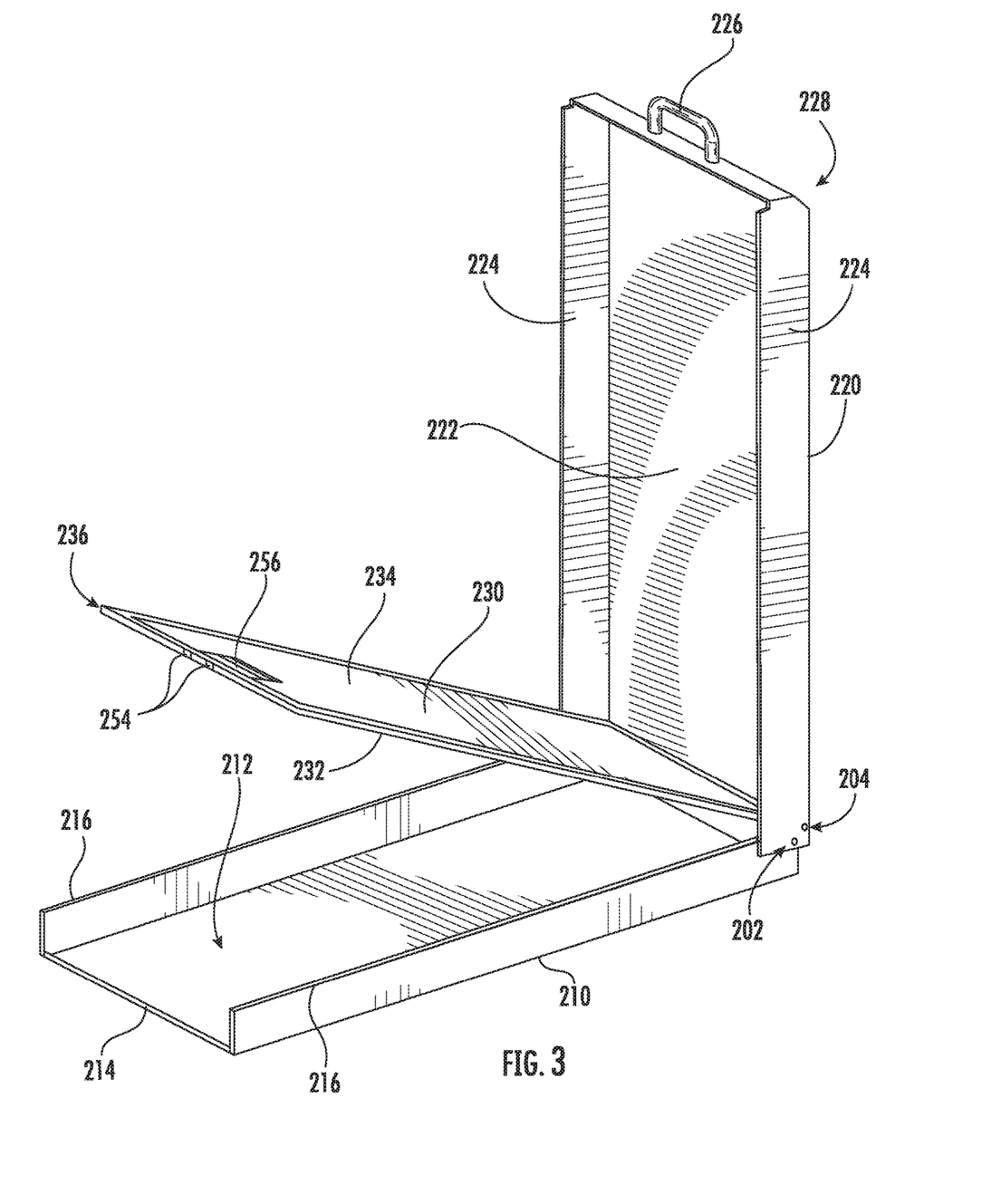
Figure 4:
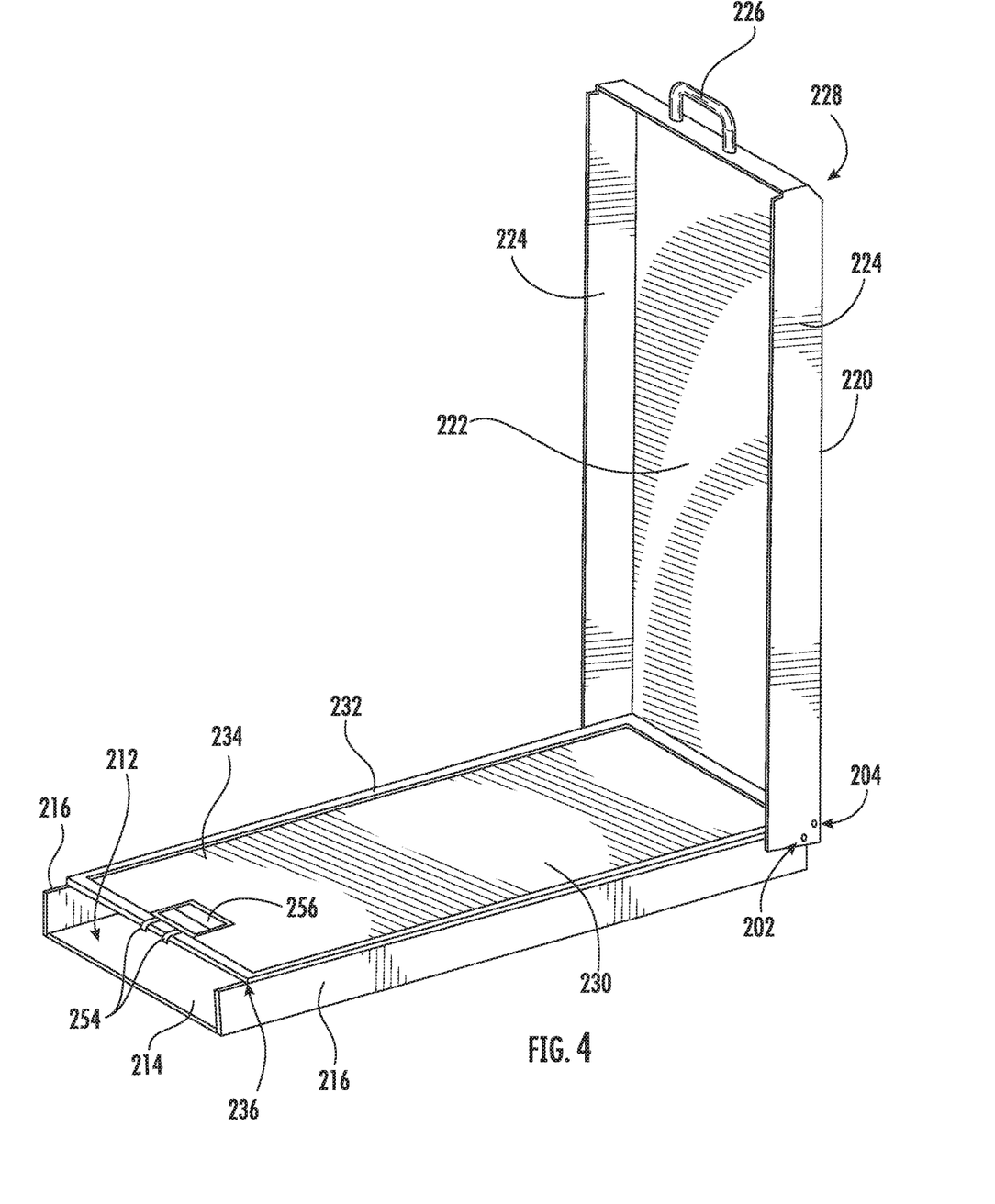

FIGS. 2 through 4 are perspective views of griddle 200. Although described in greater detail below in the context of range appliance 100, it will be understood that griddle 200 may be used in or with any suitable cooktop appliance in alternative example embodiments. As discussed in greater detail below, griddle 200 includes features for limiting grease splatter and facilitating storage of griddle components.

Griddle 200 includes a cooking plate 210. Cooking plate 210 has a top surface 212, e.g., on a bottom wall 214 of cooking plate 210, on which food items may be cooked. For example, a gas burner below cooking plate 210 may heat cooking plate 210 and food items thereon. Top surface 212 of cooking plate 210 may be flat or planar and may also be rectangular. Top surface 212 of cooking plate 210 may be generally horizontal on top panel 142. Side walls 216 of cooking plate 210 may extend upwardly from bottom wall 214 on opposite sides of cooking plate 210.

Griddle 200 also includes a cover 220. Cover 220 is rotatable relative to cooking plate 210, e.g., on a hinge 202 at rear portion of cover 220, between a closed configuration (FIG. 1) and an open configuration (FIG. 2). Cover 220 is positioned over top surface 212 of cooking plate 210 in the closed configuration of cover 220. Thus, cover 220 may enclose and protect top surface 212 of cooking plate 210 in the closed configuration. Cover 220 may be generally horizontal over cooking plate 210 in the closed configuration. Conversely, cover 220 is rotated away from cooking plate 210 in the open configuration of cover 220, e.g., such that cover 220 is not positioned over top surface 212 of cooking plate 210. In particular, cover 220 may be rotated away from the generally horizontal arrangement of the closed configuration to a more vertical orientation in the open configuration. Thus, top surface 212 of cooking plate 210 is usable and cover 220 does not block access to cooking plate 210 in the open configuration. As may be seen from the above, a user may rotate cover 220 relative to cooking plate 210 from the closed configuration to the open configuration, e.g., when the user is cooking on cooking plate 210, and the user may rotate cover 220 relative to cooking plate 210 from the open configuration to the closed configuration, e.g., after the user is finished cooking on cooking plate 210.

Cover 220 may be rotatable relative to cooking plate 210 to a degree that facilitates storage of cover 220 on top panel 102. For example, cover 220 may be rotatable relative to cooking plate 210 by no less than ninety degrees (90°) between the closed and open configurations. In particular, cover 220 may be rotatable relative to cooking plate 210 by no less than ninety degrees (90°) and no more than one-hundred and thirty degrees (130°) between the closed and open configurations. Such rotation of cover 220 relative to cooking plate 210 facilitates storage of cover 220 due to the fact the gravity may urge cover 220 to further rotate away from cooking plate 210 rather than towards cooking plate 210 after rotating cover 220 relative to cooking plate 210 to the orientations described above.

Cover 220 may be a metal cover 220, and cover 220 may be formed of stainless steel, enameled steel, etc. Cover 220 may have a rectangular shape. For example, cover 220 may also include a top wall 222 that is shaped complementary to top surface 212 of cooking panel 210. Side walls 224 of cover 220 may extend downwardly from top wall 222 on opposite sides of cover 220. A handle 226 at a distal end portion 228 of cover 220 may assist a user with rotating cover 220 between the open and closed configurations.

Griddle 200 also includes a splatter shield 230. Splatter shield 230 is rotatable relative to cover 220, e.g., on a hinge 204 at rear portion of splatter shield 230, between a closed configuration (FIG. 2) and an open configuration (FIG. 4). Splatter shield 230 is positioned over top surface 212 of cooking plate 210, e.g., on side walls 216 of cooking plate 210, in the open configuration of splatter shield 230. Splatter shield 230 may be generally horizontal over cooking plate 210 in the open configuration. Thus, splatter shield 230 may block grease splatter from cooking plate 210 in the open configuration. Conversely, splatter shield 230 may be nested within cover 220 in the closed configuration. Thus, splatter shield 230 may be stored within and rotate with cover 220 in the closed configuration. As may be seen from the above, a user may rotate splatter shield 230 relative to cover 220 from the closed configuration to the open configuration, e.g., when the user is cooking on cooking plate 210, and the user may rotate splatter shield 230 relative to cover 220 from the open configuration to the closed configuration, e.g., after the user is finished cooking on cooking plate 210.

Splatter shield 230 may include a frame 232 and a, e.g., metal, mesh fabric 234. Mesh fabric 234 is mounted to frame 232. Frame 232 and/or mesh fabric 234 may be shaped complementary to top surface 212 of cooking plate 210. Mesh fabric 234 may block grease splatter from cooking plate 210. In alternative example embodiments, splatter shield 230 may be a perforated metal panel, e.g., shaped complementary to top surface 212 of cooking plate 210.

Figure 5:
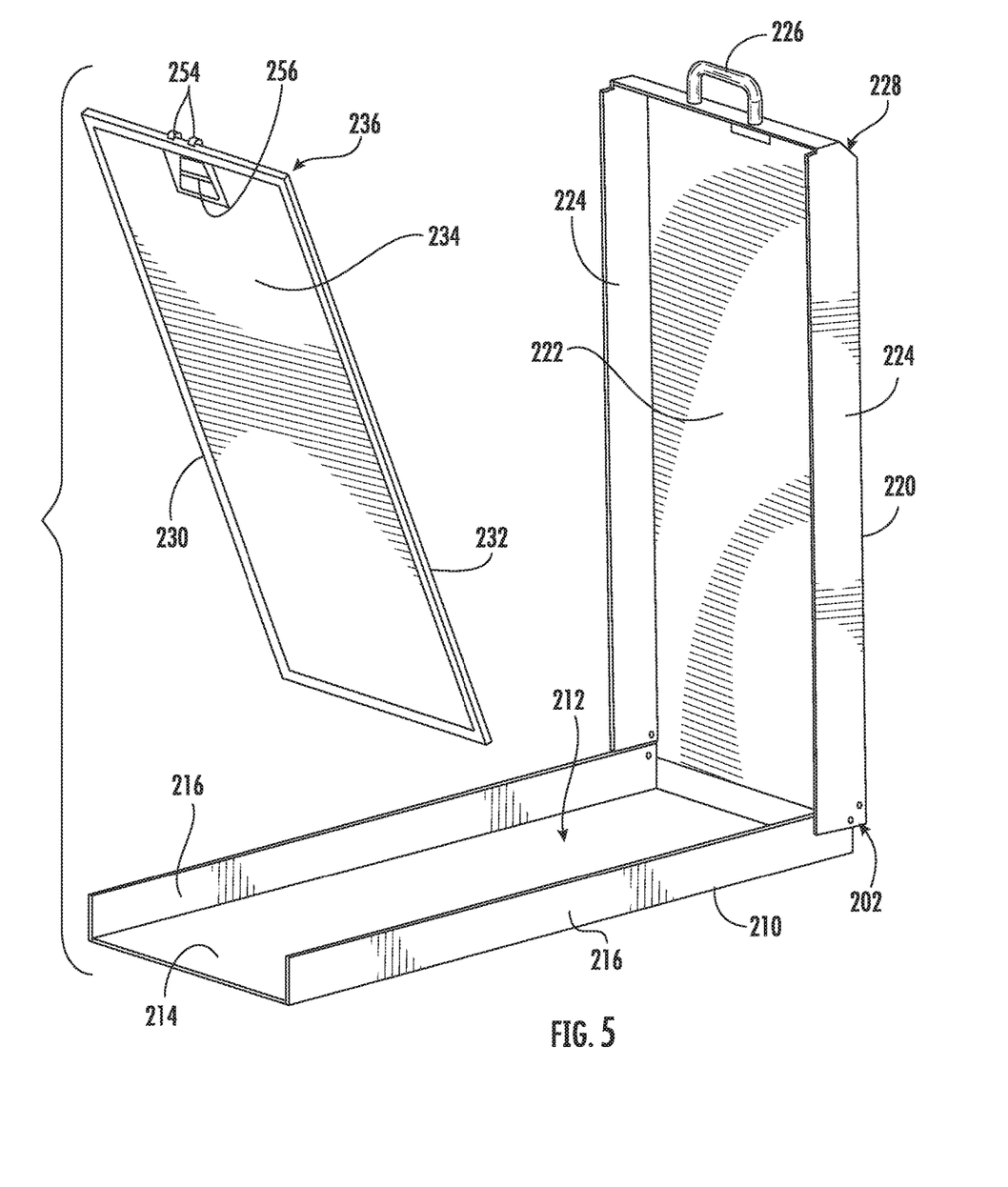
FIGS. 5 and 6 are perspective views of the griddle of FIG. 2 with a splatter shield and cover shown in various configurations.
Figure 6:
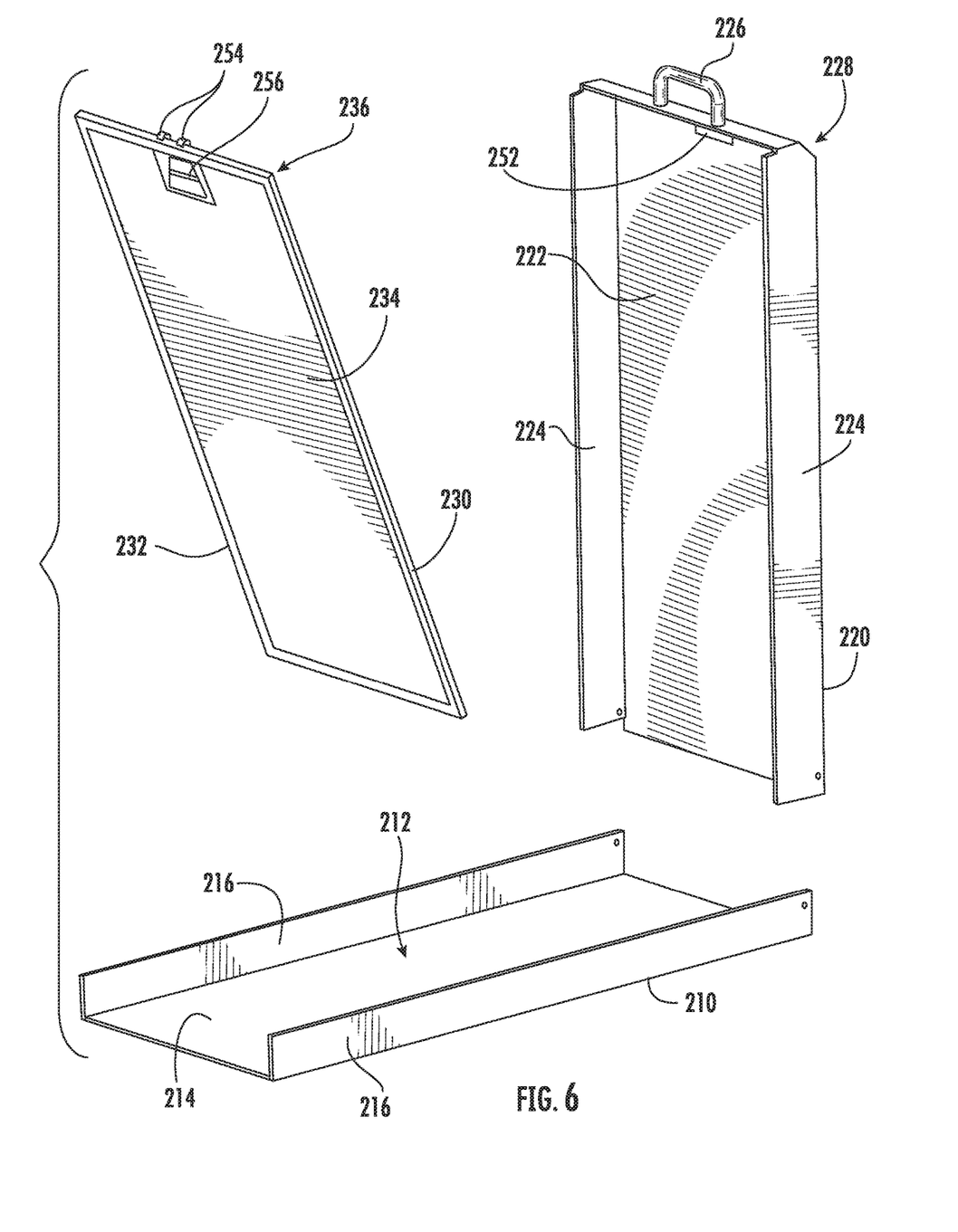
Figure 7:
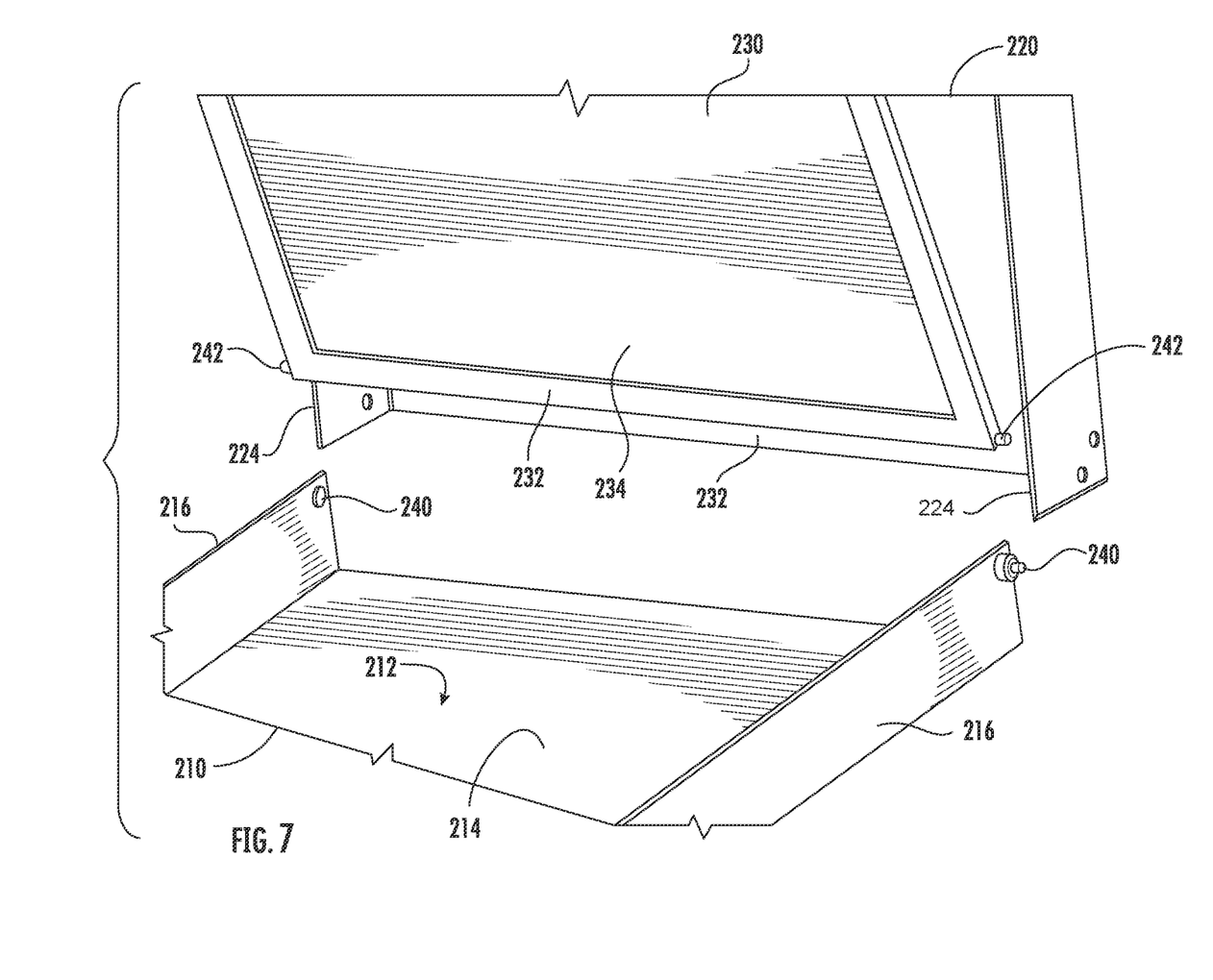
FIG. 7 is a partial perspective view of the griddle of FIG. 6.

FIGS. 5 and 6 are perspective views of griddle 200. As shown in FIGS. 5 and 6, cover 220 and splatter shield 230 may be removable from cooking plate 210. In particular, cover 220 and splatter shield 230 may be tool-lessly removable from cooking plate 210. With reference to FIG. 7, griddle 200 may include first spring-loaded hinge pins 240 and second spring-loaded hinge pins 242. First spring-loaded hinge pins 240 rotatably couple cooking plate 210 and cover 220. For example, first spring-loaded hinge pins 240 may be mounted to cooking plate 210 and extend through cover 220. To remove cover 220, a user may manually retract first spring-loaded hinge pins 240 through cover 220. Second spring-loaded hinge pins 242 rotatably couple cover 220 and splatter shield 230. For example, second spring-loaded hinge pins 242 may be mounted to splatter shield 230 and extend through cooking plate 210. To remove splatter shield 230, a user may manually retract second spring-loaded hinge pins 242 through cooking plate 210.

Figure 8:
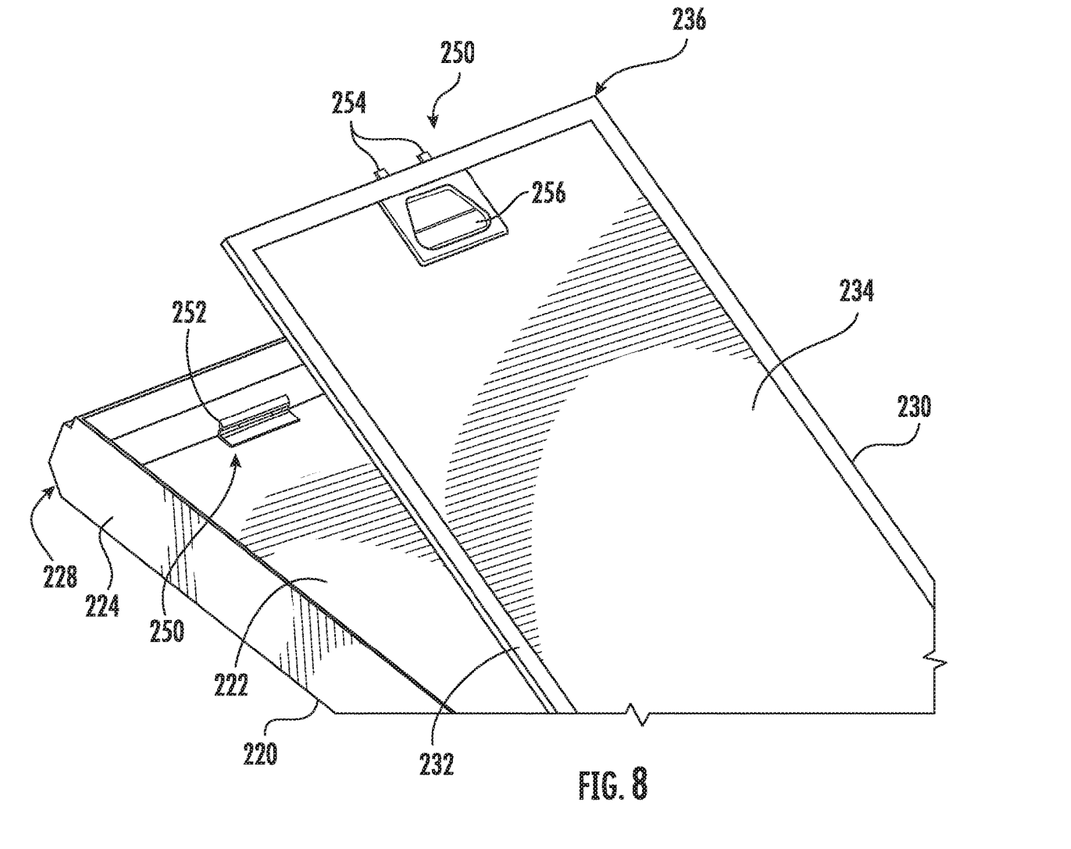
FIG. 8 is a partial perspective view of the griddle of FIG. 2 with the splatter shield show partially rotated relative to the cover.

FIG. 8 is a partial perspective view of griddle 200. As shown in FIG. 8, griddle 200 may include a latch 250. Latch 250 may lock splatter shield 230 in the closed configuration. For example, latch 250 may selectively couple a distal end portion 236 of splatter shield 230 in distal end portion 228 of cover 220. Latch 250 may include a flange 252 on cover 220 and spring-loaded pins 254 on splatter shield 230. A user may pull on a handle 256 of splatter shield 230 to retract spring-loaded pins 254 and adjust splatter shield 230 from the closed configuration to the open configuration.

As may be seen from the above, griddle 200 may include a hinged cover 220 with an integrated splatter shield 230. Griddle 200 may be advantageously convenient relative to known griddles, e.g., by allowing cover 220 to be rotated for storage and by including splatter shield 230.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
   a top panel;
   a griddle positioned on the top panel, the griddle comprising
   a cooking plate;
   a cover rotatable relative to the cooking plate between a closed configuration and an open configuration, the cover positioned over a top surface of the cooking plate in the closed configuration of the cover; and
   a splatter shield rotatable relative to the cover between a closed configuration and an open configuration, the splatter shield nested within the cover in the closed configuration of the splatter shield, the splatter shield positioned over the top surface of the cooking plate in the open configuration of the splatter shield.

2. The cooktop appliance of claim 1, wherein the cover is rotatable relative to the cooking plate by no less than ninety degrees between the closed and open configurations.

3. The cooktop appliance of claim 2, wherein the cover is rotatable relative to the cooking plate by no less than ninety degrees and no more than one-hundred and thirty degrees between the closed and open configurations.

4. The cooktop appliance of claim 1, further comprising a first spring-loaded hinge pin rotatably coupling the cooking plate and the cover.

5. The cooktop appliance of claim 4, further comprising a second spring-loaded hinge pin rotatably coupling the cover and the splatter shield.

6. The cooktop appliance of claim 1, further comprising a spring-loaded hinge pin rotatably coupling the cover and the splatter shield.

7. The cooktop appliance of claim 1, further comprising a latch selectively coupling a distal end portion of the splatter shield in a distal end portion of the cover.

8. The cooktop appliance of claim 1, wherein the cover, the splatter shield or both the cover and the splatter shield are tool-lessly removable from the cooking plate.

9. The cooktop appliance of claim 1, wherein the splatter shield comprises a framed mesh panel shaped complementary to the top surface of the cooking plate.

10. The cooktop appliance of claim 1, wherein the splatter shield comprises a perforated metal panel shaped complementary to the top surface of the cooking plate.

11. A cooktop appliance, comprising:
    a top panel;
    a griddle positioned on the top panel, the griddle comprising
    a cooking plate;
    a cover rotatable relative to the cooking plate between a closed configuration and an open configuration, the cover positioned over a top surface of the cooking plate in the closed configuration of the cover; and
    a splatter shield rotatable relative to the cover between a closed configuration and an open configuration, the splatter shield positioned over the top surface of the cooking plate in the open configuration of the splatter shield,
    wherein the cooking plate, the cover and the splatter shield are rectangular.

12. The cooktop appliance of claim 11, wherein the cover is rotatable relative to the cooking plate by no less than ninety degrees between the closed and open configurations.

13. The cooktop appliance of claim 12, wherein the cover is rotatable relative to the cooking plate by no less than ninety degrees and no more than one-hundred and thirty degrees between the closed and open configurations.

14. The cooktop appliance of claim 11, further comprising a first spring-loaded hinge pin rotatably coupling the cooking plate and the cover.

15. The cooktop appliance of claim 14, further comprising a second spring-loaded hinge pin rotatably coupling the cover and the splatter shield.

16. The cooktop appliance of claim 11, wherein the splatter shield is nested within the cover in the closed configuration of the splatter shield.

17. The cooktop appliance of claim 11, further comprising a latch selectively coupling a distal end portion of the splatter shield in a distal end portion of the cover.

18. The cooktop appliance of claim 11, wherein the cover, the splatter shield or both the cover and the splatter shield are tool-lessly removable from the cooking plate.

19. The cooktop appliance of claim 11, wherein the splatter shield comprises a framed mesh panel shaped complementary to the top surface of the cooking plate.

20. The cooktop appliance of claim 11, wherein the splatter shield comprises a perforated metal panel shaped complementary to the top surface of the cooking plate.

* * * * *